United States Patent

Kapsambelis et al.

[15] 3,673,389

[45] June 27, 1972

[54] IDENTIFICATION AND REGISTRATION SYSTEM

[72] Inventors: Christos Basil Kapsambelis, Canton; David Janett Collins, Duxbury, both of Mass.

[73] Assignee: Computer Identics Corporation, Westwood, Mass.

[22] Filed: March 2, 1970

[21] Appl. No.: 15,596

[52] U.S. Cl.............235/61.11 R, 235/61.11 E, 235/61.12 N, 235/61.7 B, 194/4, 340/149 A

[51] Int. Cl.......................G06k 7/08, G06k 7/10, G07f 7/02, G06k 19/06

[58] Field of Search.................235/61.7 B, 61.12, 61.12 NP, 235/61.11 E, 61.11 D; 340/174.1 G, 149 A; 200/46; 194/4

[56] References Cited

UNITED STATES PATENTS

| | | | |
|---|---|---|---|
| 3,316,392 | 4/1967 | Bailey | 235/61.12 N |
| 3,474,230 | 10/1969 | McMillen | 235/61.7 B |
| 3,530,281 | 9/1970 | Smeiman | 235/61.11 R |
| 3,408,483 | 10/1968 | Zuse | 235/61.12 X |
| 2,706,599 | 4/1955 | Smith | 235/61.11 |
| 3,341,691 | 9/1967 | Modersohn | 235/61.11 E |
| 3,533,657 | 10/1970 | Da Silva | 235/61.11 E |
| 3,274,611 | 9/1966 | Brown | 340/174.1 G |
| 3,281,804 | 10/1966 | Dirks | 340/174.1 G |

*Primary Examiner*—Maynard R. Wilbur
*Assistant Examiner*—Robert M. Kilgore
*Attorney*—Iandiorio and Grodberg, Joseph S. Iandiorio and Lester S. Grodberg

[57] ABSTRACT

A medium and a system for reading information arrayed in a plurality of sets on the medium, each of the sets including a plurality of items arranged to form a plurality of subsets of items, each subset including an item from at least one of the sets, the items being binary representations having either a first or a second state including means for simultaneously scanning each of the subsets, means for generating an input signal each time a subset is scanned and storage means for receiving an item of information from each set each successive scan of a subset.

10 Claims, 11 Drawing Figures

CHRISTOS B. KAPSAMBELIS
DAVID J. COLLINS
INVENTORS.
BY
Iandiorio & Grodberg
ATTORNEYS.

CHRISTOS B. KAPSAMBELIS
DAVID J. COLLINS
INVENTORS.
BY
Iandiorio & Grodberg
ATTORNEYS.

CHRISTOS B. KAPSAMBELIS
DAVID J. COLLINS
INVENTORS.
BY
Iandiorio & Grodberg
ATTORNEYS.

CHRISTOS B. KAPSAMBELIS
DAVID J. COLLINS
INVENTORS
BY
Iandiorio & Grodberg
ATTORNEYS.

IDENTIFICATION AND REGISTRATION SYSTEM

BACKGROUND OF INVENTION

This invention relates to a medium and an automatic reading system adapted to read and orient information from the medium independent of in which one of a number of predetermined postures the medium is presented, and more particularly to such a system adapted to use the information read to initiate system clocking signals.

Conventional label reading machines often require complex large and expensive arrangements to generate, distribute and apply timing signals by means of which a parcel of information may be properly read and interpreted from a particular label or other medium. These arrangements must take into consideration the size of the parcel of information and the time required to read it as well as the size and number of each discrete portion of information in such a parcel and the time required to read each such portion. Also in such machines, there is often a great deal of effort devoted to determining whether or not the label to be read is in the proper position for if it is not, the sought information may be inaccessible to the machine or accessible, but unintelligible. Attempts to remedy this registration or orientation problem by using specially designed cards or labels have produced cards which have specially composed additional registration data on them requiring special reading equipment. Even so, those types of cards may result in a rejection of a disoriented card rather than the reorienting and reading of it.

SUMMARY OF INVENTION

It is therefore an object of this invention to provide a reading machine capable of reading an information bearing medium in any one of a number of predetermined positions and recognizing in which of the positions the medium is received.

It is a further object of this invention to provide such a reading machine capable of processing information received in any one of a number of predetermined orientations.

It is a further object of this invention to provide such a reading machine capable of operating with a simple timing system driven from the incoming information.

It is a further object of this invention to provide an information medium for use with such a reading machine capable of providing an arrangement of registration indicia and other information from all of which timing signals may be derived.

This invention features an automatic reading system adapted to read information arrayed in a plurality of sets on a medium, each of the sets including a plurality of items arranged to form a plurality of subsets of items, each subset including an item, from at least one of the sets, the items being binary representations having first or second states. There are means for simultaneously scanning each of the sets and sequentially scanning each of the subsets; and means for generating an input signal each time a subset is scanned. Storage means, responsive to a signal from the means for generating, receive an item of information from each set each successive scan of a subset.

DISCLOSURE OF PREFERRED EMBODIMENT

Other objects, features and advantages will occur from the following description of a preferred embodiment and the accompanying drawings, in which.

Figure 1:
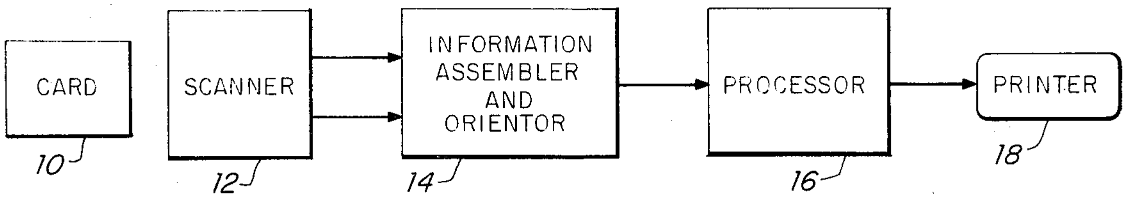
FIG. 1 is a block diagram of a reading machine according to this invention including an information bearing medium.

The invention may be accomplished by a reading system for reading an information bearing medium 10, FIG. 1. Information on medium 10 is read by scanner 12 which provides relative motion between its sensing mechanism and medium 10. Scanner 12 receives and reads medium 10 in any one of four predetermined postures and submits signals representative of information read to the information assembler and orientor 14 which accumulates those signals in an ordered manner and determines in which one of the four postures the information was supplied to it. A processor 16 such as a general purpose computer or a special purpose computer may be used to process the data supplied by assembler 14 and/or to combine it with other relevant information to produce a useable product at printer 18 or any other desired output equipment.

The system of FIG. 1 may be implemented in various ways according to the invention. For example, medium 10 may be a label, card or other "two-dimensional" medium, i.e. one having substantial length and width but relatively little thickness or it may be a "three-dimensional" object, i.e. one having substantial size in all three dimensions, length, width and thickness.

The medium 10 may be a card or label having a regular shape with defined edges such as a triangle, parellelogram, trapezoid, polygon etc. Or it may have an irregular shape and/or indeterminate edges. The information on medium 10 may be in alphanumeric characters, in directly readable or encoded or abbreviated form. The information may be encoded in decimal, binary, trinary or any other system and may use indicia distinguishable by their reflectivity, lack of reflectivity or degrees of reflectivity, by their color, or other means. The information may include registration indicia which are in the same form as the other information carried by the medium or in other forms.

Scanner 12 may utilize any suitable apparatus such as a cathode ray tube, vidicon tube, photoelectric cells or sensors, mechanical fingers, etc; and may include means for moving either the medium 10 or scanner 12 relative to the other.

Figure 2:
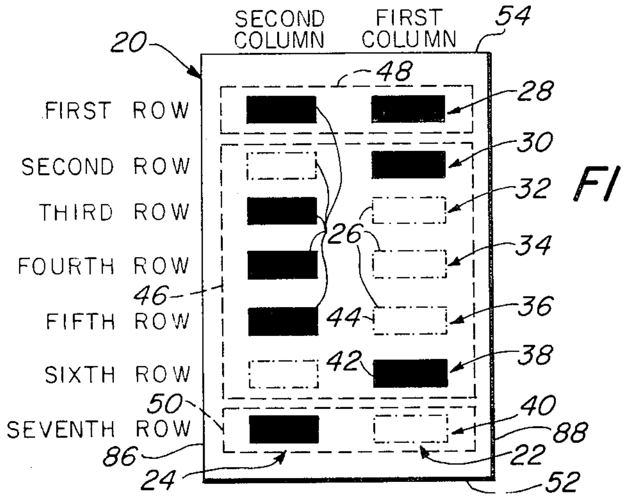
FIG. 2 is a diagram of one form of information bearing medium, a card, according to this invention.

One specific embodiment of medium 10 which may be used in the system of this invention is a card 20, FIG. 2, having a plurality of sets of information: first column 22 and second column 24, each column 22, 24 having a plurality of items 26, and a plurality of subsets of information: first row 28, second row 30, third row 32, fourth row 34, fifth row 36, sixth row 38, seventh row 40. Each item 26 is a binary representation that assumes either one of two states. In FIG. 2, the two states on card 20 are a punched hole 42 indicated by the solid black rectangles and an unpunched hole 44, indicated by the dot-dashed rectangles.

In the configuration of FIG. 2, information to be read by the system may be grouped in the area 46 and registration indicia may be set out in two groups 50, 48 proximate edge 52 and edge 54, respectively. Each of groups 48 and 50 contain two registration marks or items 26; in group 48 both items are punched; in group 50 only the item in second column 24 is punched. Card 20 is shown with only two columns and seven rows, but both quantities may be increased either by enlarging the card or decreasing the size of the items 26, or both, so that there are many more than two columns and/or seven rows. Since card 20 has only four edges, it only needs two groups 48, 50 of two items each to define the four positions that it may assume of interest in this embodiment. Thus additional columns and rows added to card 20 need not contain additional registration information.

Card 20 may be constructed to provide a feature that may be used to provide timing signals to the system of FIG. 1: if items 26 are binary representations in one of two states, i.e. punched or unpunched and one of those states, viz. the punched 42 state, is arbitrarily selected as a timing aid, then a coding system is selected such that there is always a punched 42 item 26 in one of the columns 22, 24, in each row 28, 30, 32, 34, 36, 38 and 40. Thus, when all columns are simultaneously scanned sequentially row by row, there is at least one punched 42 item 26 sensed in every row which may be used as a timing mark. With the card 20 of FIG. 2, this is accomplished by using a trinary code in which the three states are:

| First Column Item | Second Column Item | Trinary Number |
|---|---|---|
| Punched | Unpunched | 0 |
| Unpunched | Punched | 1 |
| Punched | Punched | 2 |

CHART I

With such a coding system, there is need for at least one punched item in each row and the total number of representations are $3^5$ or 243. As discussed supra, the size, number, coding and arrangement of information items may be varied.

Figure 3:
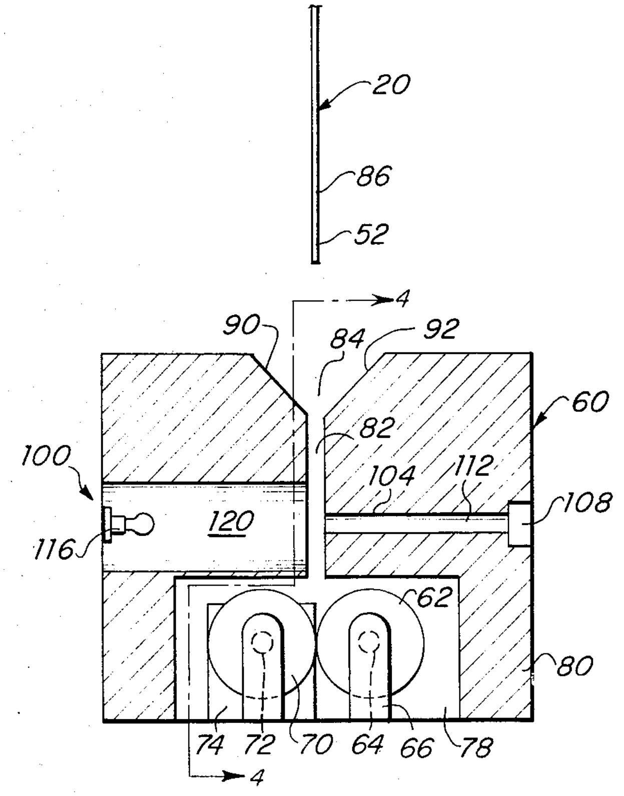
FIG. 3 is a cross-sectional view of a scanner for sensing information on a card such as shown in FIG. 2, taken along line 3—3 of FIG. 4.
Figure 4:
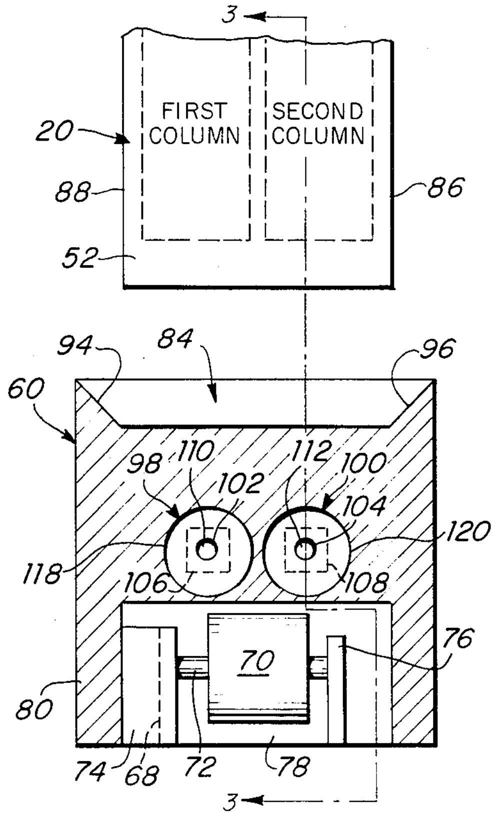
FIG. 4 is a sectional view of the scanner of FIG. 3 taken along line 4—4 of FIG. 3.

Card 20 may be received in a scanner 60, FIGS. 3 and 4, including an idler roller 62 having a shaft 64 rotatably mounted in bearings 66, 68 and a drive roller 70 having a shaft 72 driven by motor 74 and journaled at 76, all of which is enclosed in recess 78 of housing 80. A card 20 is fed to rollers 62 and 70 through passage 82. An input aperture 84 is shaped to orient card 20 so that either its edge 52 or edge 54 and not its edges 86, 88, FIG. 2, first enters passage 82. To facilitate this action aperture 84 has two pairs of opposing inclined walls 90, 92 and 94, 96 which converge towards passage 82 and rollers 62 and 70. In scanner 60, there is a sensor channel for each set of information or column on the cards to be read. Since, in this embodiment, the card to be read, card 20, has two columns, 22, 24, there are two sensor channels 98, 100. Each channel 98, 100 may include a bore 102, 104 in housing 80 including a photoelectric sensor 106, 108 communicating with passage 82, host to card 20, by means of a fiber rod 110, 112. A source of illumination 114, 116 (114 not shown) may be provided in each of bores 118, 120 aligned with bores 102, 104.

With the scanner 60, there are four postures which card 20 may assume upon entrance to passage 82, as shown in FIGS. 5, 6, 7 and 8, where card 20 is shown in simplified form having two groups 48, 50 of registration information each containing two items 130, 132 and 134, 136 of information, respectively; items 130, 132, 134 are punched items; item 136 is unpunched. Other information is grouped in area 46. Due to the shape of card 20 and aperture 84, card 20 may be drawn through scanner 60 with edge 52 first and its front 140 facing sensors 106, 108, FIG. 5; with edge 54 first and its back 142 facing sensors 106, 108, FIG. 7; and with edge 54 first and its front 140 facing sensors 106, 108. The orientation of FIG. 6 may be obtained by rotating card 20, FIG. 5, about its edge 52, and the orientations of FIG. 7 and 8 may be obtained by rotating cards 20, FIG. 5 and 6, respectively, about their edges 86. For facilitating the manipulation of these four orientations by the system of FIG. 1, the four positions shown in FIGS. 5, 6, 7 and 8 have been denoted in Binary code 00, 01, 10 and 11.

Although in this embodiment the items 26 of information are carried on card 10 by means of punched and unpunched positions, this is not a necessary limitation. For example, the items 26 may be represented by reflective and non-reflective marks. In that case, however, the positions of the reflective and non-reflective mark would have to appear on both sides of the card 10, on its front and on its back in order to permit it to be read and registered in each of the four predetermined positions.

Figure 9:
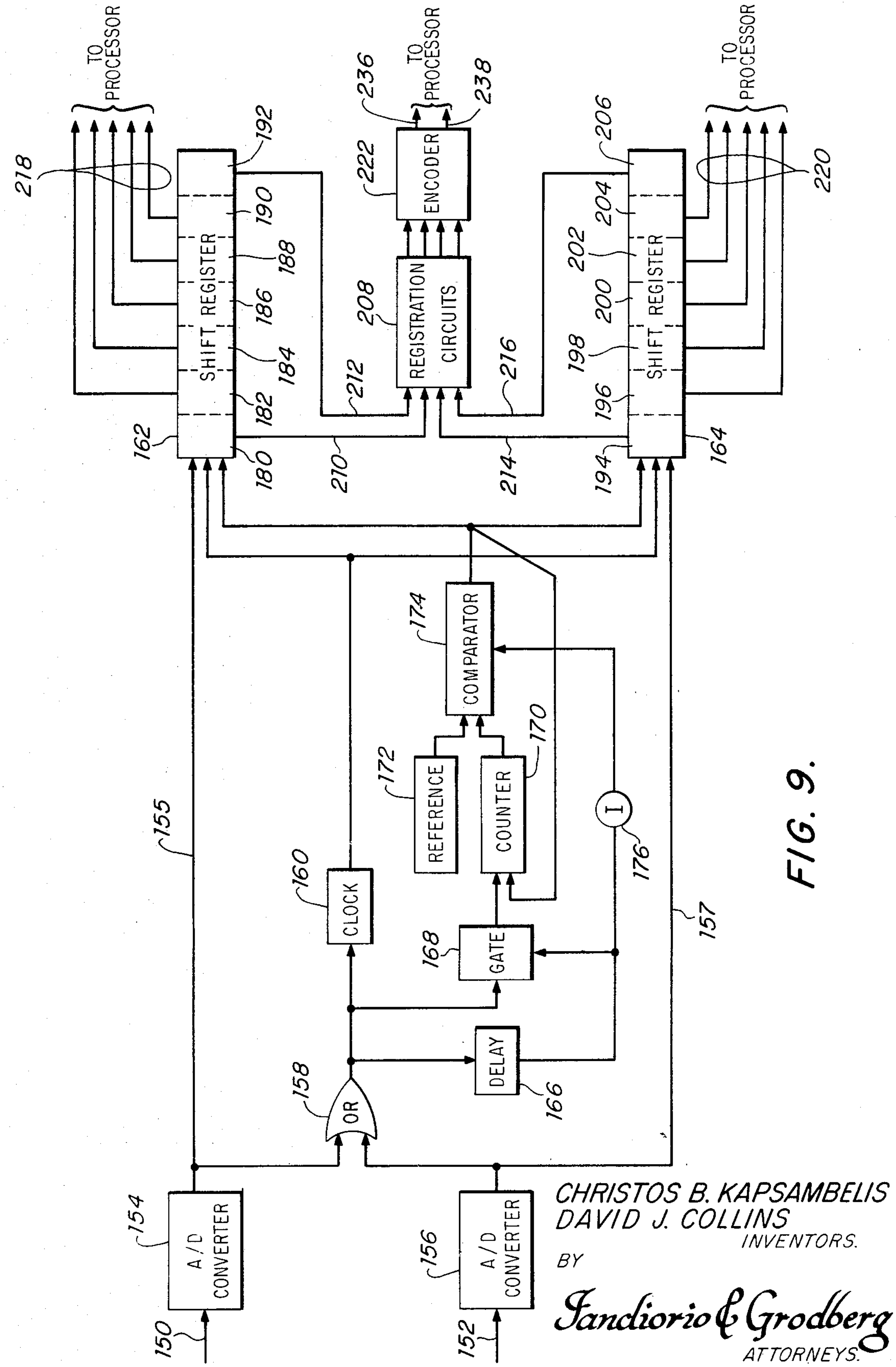
FIG. 9 is a more detailed block diagram of the information assembler and orientor of FIG. 1.
Figure 11:
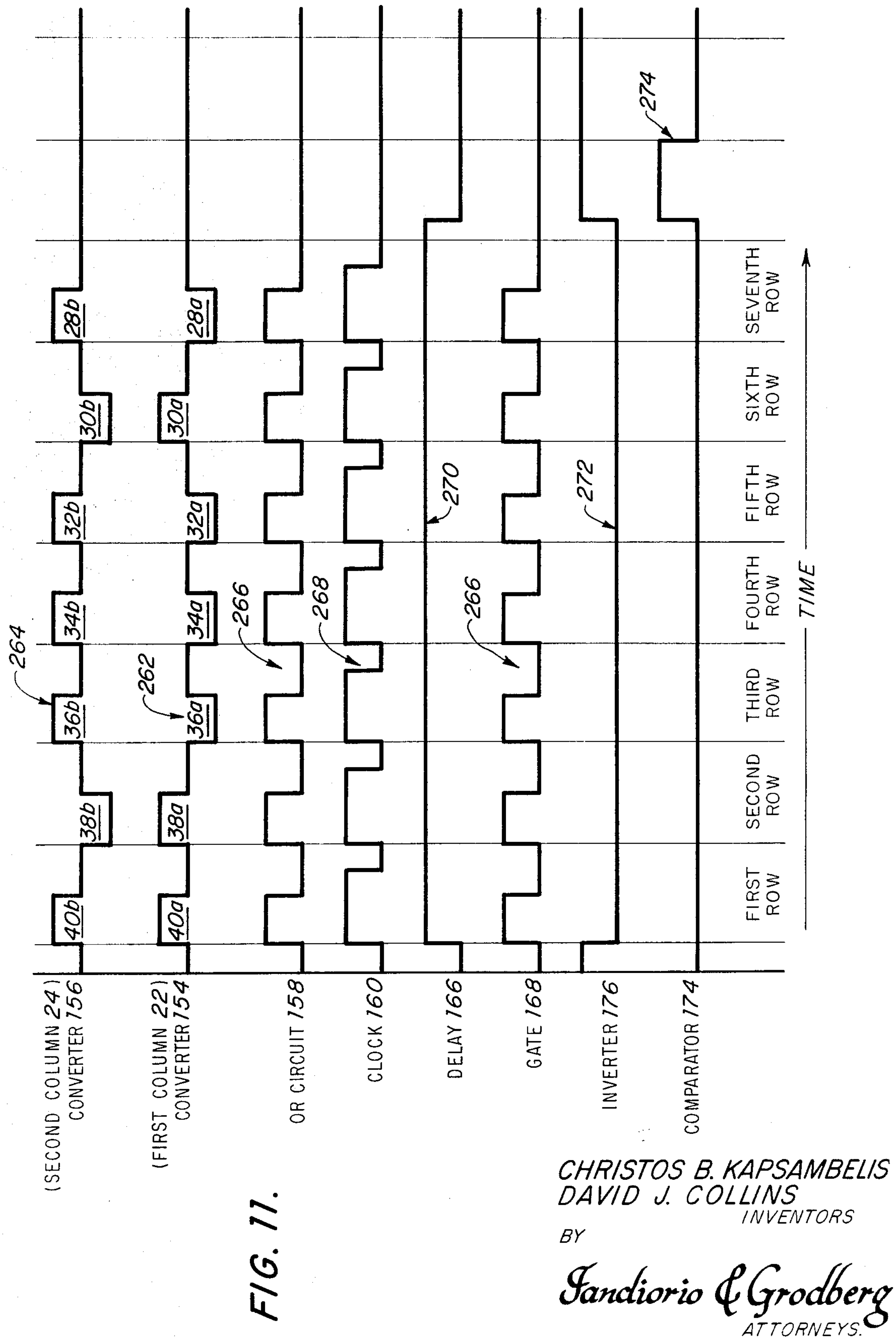
FIG. 11 is a diagram of the waveforms of the outputs of various components of the system of FIG. 9.

A more detailed diagram of information assembler and orientor 14, FIG. 1, useable with card 20, FIGS. 2, 5, 6, 7 and 8, and scanner 60, FIGS. 3 and 4, includes lines 150, 152, FIG. 9, which deliver analog signals from sensors 106, 108 to analog to digital converters 154, 156, respectively. OR circuit 158 produces an output signal, each time either converter 154 or 156 produces an output, which is utilized by three circuits. First the output signal causes clock circuit 160 to send a shift pulse to each of channel shift registers 162, 164 whereby the very signal(s) emitted by either or both converters 154, 156 on lines 155, 157 that caused OR circuit 158 to enable clock circuit 160 are admitted to the channel shift registers 162, 164 corresponding to the channels 98, 100 in scanner 60, FIGS. 3 and 4, from which the information was read. Second, that signal is received by delay circuit 166 whose delay is greater than the time between scans of successive rows on card 20 each of which rows must include at least one item of information in the proper state to produce a signal to at least one of converters 154, 156, thus also at OR circuit 158. The output of delay circuit 166 is used to enable gate 168, continuously during the scan of a card 20, because its delay exceeds the time required for scans of successive rows. Each time a signal or pulse is received from OR circuit 158, it is passed by gate 168 to counter 170 so that counter 170 contains a record of the number of rows scanned. The outputs of counter 170 and reference circuit 172 are submitted to comparator 174 which produces an output signal, as soon as the count from counter 170 equals that from reference circuit 172, if the signal from delay 166 has expired, thereby heralding the end of the card scan and through inverter 176 enabling comparator 174. In this embodiment reference circuit 172 contains a count of seven for that is the number of rows on card 20, FIG. 2. Thus, the registration information is easily identified and submitted to registration circuit 208 by lines 210, 212 connected to positions 180, 192 of register 162 and by lines 214, 216 connected to positions 194, 206 of register 164. The other information from the second through sixth rows, 30, 32, 34, 36, 38 in columns 22, 24 is transferred from positions 182, 184, 186, 188, 190 of register 162, and positions 196, 198, 200, 202, 204 of register 164 for further processing, such as to processor 16, via lines 218, 220, respectively. The registration information on lines 210, 212, 214, 216 is reviewed in registration circuit 208 to determine which of the four postures card 20 was in when scanned and then encoder 222 receives that determination and indicates the posture by the proper code 00, 01, 10, 11, FIGS. 5–8. The two line output of encoder 222 accompanies the ten lines 218, 220 to processor 16 to indicate the orientation of the information there presented.

The output from comparator 174 simultaneously empties each of the seven positions 180, 182, 184, 186, 188, 190, 192 and 194, 196, 198, 200, 202, 204, 206 of registers 162, 164, respectively. Assuming that card 20 passed through scanner 60 in the posture as discussed with reference to FIG. 5, the 00 posture, then channel register 162 has accumulated and stored the information read from the items 26 in the seven rows 28, 30, 32, 34, 36, 38, 40 in the first column 22 in its positions 180, 182, 184, 186, 188, 190, 192 and channel register 164 has accumulated and stored the information read from the items 26 in the seven rows 28, 30, 32, 34, 36, 38, 40 in the second column 24 in its positions 194, 196, 198, 200, 202, 204, 206.

Figure 10:
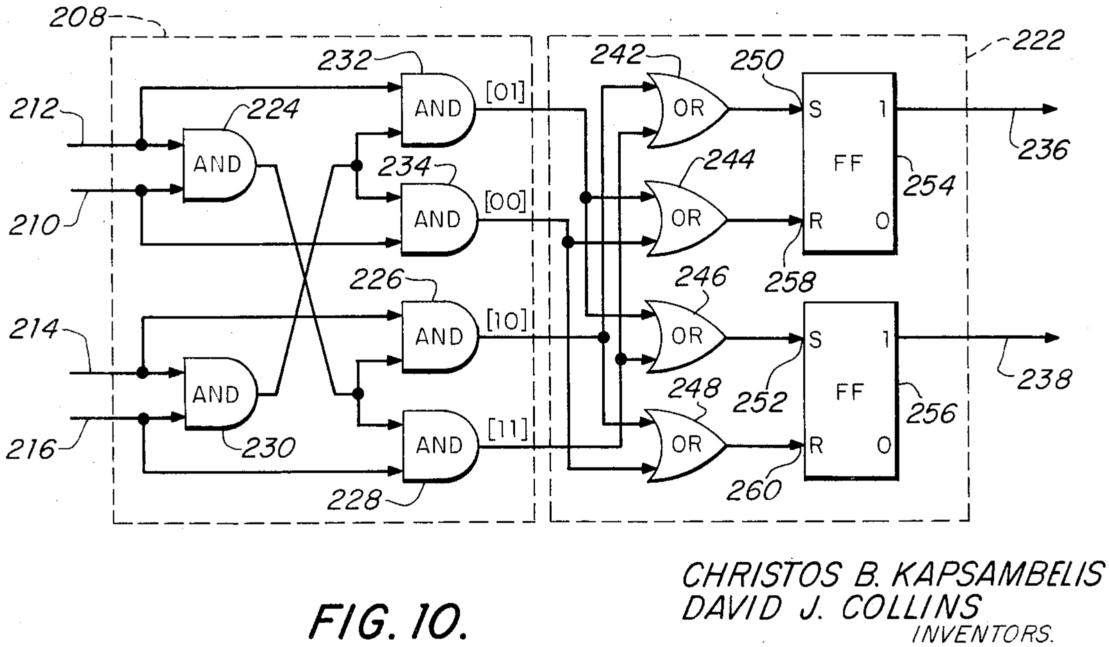
FIG. 10 is a more detailed block diagram of the registration circuits and encoder of FIG. 9.

Registration circuit 208 may include, FIG. 10, an AND circuit 224 having as inputs lines 210, 212 and providing one output to AND circuits 226, 228 and an AND circuit 230 having as inputs lines 214, 216 and providing one output to AND circuits 232, 234. The other inputs to AND circuits 232, 234 are from lines 212, 210, respectively, and to AND circuits 226, 228 are from lines 214, 216, respectively. From FIGS. 5–8, it is apparent that if both items of registration information scanned by channel 100 are punched then card 20 is either in the posture denoted [00] or [01], FIGS. 5 and 6, and that posture is [00] if the first item encountered by channel 98 is unpunched, and the second item is punched, FIG. 5, and is [01] if the first item encountered by channel 98 is punched and the second item is unpunched, FIG. 6. Similarly, if both items of registration information scanned by channel 98 are punched that card is either in the posture denoted [ 10] or [11], FIGS. 7 and 8, and that posture is [10] if the first item encountered by channel 100 is unpunched and the second is punched, FIG. 7, and is [11] if the first item encountered by channel 100 is punched and the second is unpunched, FIG. 8. Thus, if the signal generated by sensing a punched registration information item is designated P and an unpunched one is designated $\overline{P}$, AND circuit 224 has an output when lines 210 and 212 represent that positions 180 and 192 of channel register 162, corresponding to the first and seventh rows of items sensed by the channel 98 each contain P. This determines that the posture of the card read is either [10] or [11], depending upon which of AND circuits 226, 228 has an output which in turn is a function of which of lines 214, 216 is representing that its position 194, 206 of channel register 164, corresponding to the first and seventh rows of items sensed by channel 100, contains a P. Similarly, AND circuit 230 has an output when lines 214, 216 represent that positions 194, 206 of channel register 164, corresponding to the first and seventh rows of items sensed by the channel 100 each contains P. This determines that the posture of the card read is either [00] or [01] depending upon which of AND circuits 232, 234 has an output which in turn is a function of which of lines 210, 212 is representing that its position 180, 192 of channel register 162, corresponding to the first and seventh rows of items sensed by channel 98, contains a P. The system may as well be guided on the $\overline{P}$ signals instead of the P signals, and may use other than punched-unpunched coding, viz. reflective/non-reflective radiation. The function of registration circuit 208 may be better understood by reference to CHART II which shows the contents of positions 180, 192 of register 162 and positions 194, 206 of register 164 in terms of whether punched P, or unpunched $\overline{P}$, signals were sensed from the card, correlated with FIGS. 5, 6, 7 and 8 codes [00], [01], [10], [11] and the outputs of AND circuits 224, 226, 228, 230, 232 and 234.

CHART II

| Fig. | Code | Channel register 162 Position 180 | Channel register 162 Position 192 | Channel register 164 Position 194 | Channel register 164 Position 206 | AND ct. 224 Out. | AND ct. 230 Out. | AND ct. 234 Out. | AND ct. 232 Out. | AND ct. 226 Out. | AND ct. 228 Out. |
|---|---|---|---|---|---|---|---|---|---|---|---|
| 5...... | 00 | P | $\overline{P}$ | P | P | NO | YES | YES | NO | NO | NO |
| 6...... | 01 | $\overline{P}$ | P | P | P | NO | YES | NO | YES | NO | NO |
| 7...... | 10 | P | P | P | $\overline{P}$ | YES | NO | NO | NO | YES | NO |
| 8...... | 11 | P | P | $\overline{P}$ | P | YES | NO | NO | NO | NO | YES |

The outputs of registration circuit 208, arbitrarily designated [00], [01], [10], [11], are coded to appear on two lines 236, 238 to processor 16 by encoder 222 which includes four OR circuits 242, 244, 246, 248; the outputs of circuits 242, 246 are connected to the set inputs 250, 252 of flip-flops 254, 256, respectively and the outputs of circuits 244, 248 are connected to the reset inputs 258, 260 of flip-flops 254, 256, respectively. OR circuit 242 produces an output upon receipt of an input from either of AND circuits 226, 228. OR circuit 244 produces an output upon receipt of an input from either of AND circuits 232, 234. OR circuit 246 produces an output upon receipt of an input from either of AND circuits 232, 228. And OR circuit 248 produces an output upon receipt of an input from either of AND circuits 226, 234. An output from OR circuit 242 switches flip-flop 254 to its set state wherein it produces a [1] output on line 236; from OR circuit 244 switches flip-flop 254 to its reset state wherein it produces a [0] output on line 236, from OR circuit 246 switches flip-flop 256 to its set state wherein it produces a [1] output on line 238, and from OR circuit 248 switches flip-flop 256 to its reset state wherein it produces a [0] on line 238. The function of encoder 222 may be better understood by reference to CHART III which correlates the input from AND circuits 232, 234, 226, 228, the posture of the card, the output to OR circuits 242, 244, 246, 248, the condition of flip-flops 254, 256, and the signals on lines 236, 238.

CHART III

| Input from AND circuits 232 | 234 | 226 | 228 | Card posture code | Output from OR circuits 242 | 244 | 246 | 248 | Condition of flip-flop 254 | 256 | Signal on line 236 | 238 |
|---|---|---|---|---|---|---|---|---|---|---|---|---|
| YES | NO | NO | NO | 01 | NO | YES | YES | NO | RESET | SET | 0 | 1 |
| NO | YES | NO | NO | 00 | NO | YES | NO | YES | RESET | RESET | 0 | 0 |
| NO | NO | YES | NO | 10 | YES | NO | NO | YES | SET | RESET | 1 | 0 |
| NO | NO | NO | YES | 11 | YES | NO | YES | NO | SET | SET | 1 | 1 |

Figure 5:
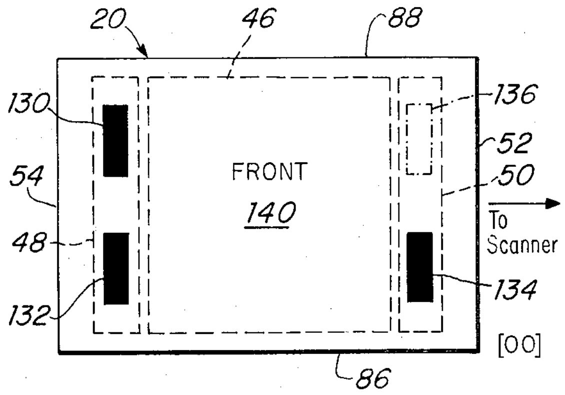
FIGS. 5, 6, 7 and 8 show a schematic drawing of an information bearing medium or card, with four registration indicia, in each of four postures that it may assume.
Figure 6:
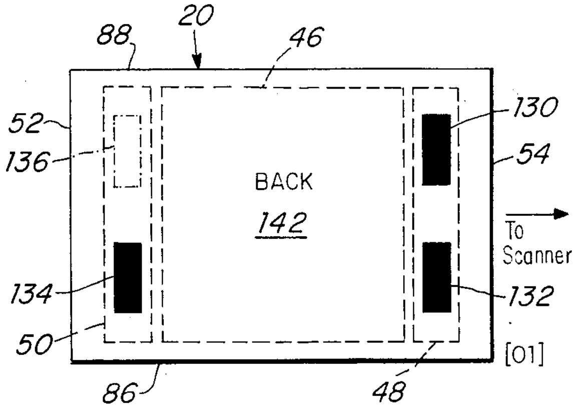
Figure 7:
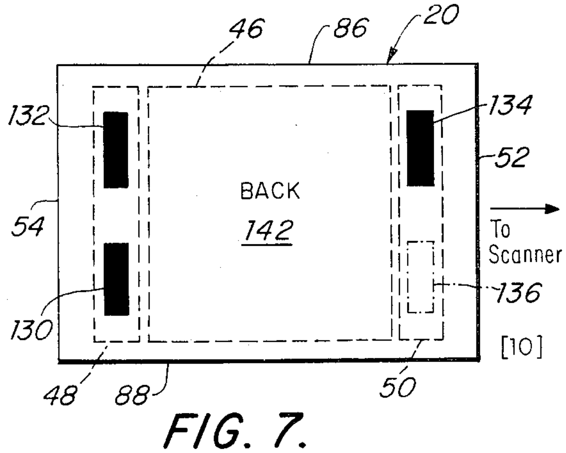
Figure 8:
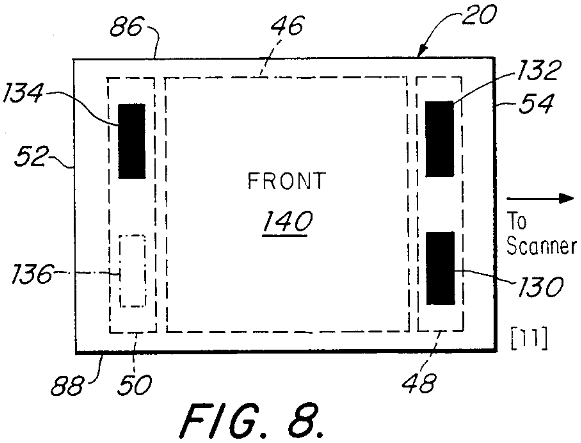

In operation assuming card 20, FIG. 2, is being scanned in the posture [00] of FIG. 5 by scanner 60, FIGS. 3 and 4, the output from channel 98 sensing first column 22 produces a series 262 of pulses 28, **30*a*, 32*a*, 34*a*, 36*a*, 40*a* at the output of converter 154 corresponding to seven rows 28, 30, 32, 34, 36, 38, 40 of items scanned in first column 22 and a series 264 of pulses 28*b*, 30*b*, 32*b*, 34*b*, 36*b*, and 40*b* at the output of converter 156 corresponding to seven rows 28, 30, 32, 34, 36, 38, 40 of items scanned in second column 24. Since there is at least one positive pulse for each row scanned;40*a*, 40*b* seventh row 40; 38*a* sixth row 38; 36*b* fifth row 36; 34*b* fourth row 34; 32*b* third row 32; 30*a* second row 30; and 28*b* first row 28, OR circuit 158 produces a series 266 of seven pulses which produce a series 268 of clock pulses from clock circuit 160 that successively shift the two series 262, 264 of pulses into registers 162, 164. The series of pulses 266 from OR circuit 158, also simultaneously submitted to delay 166 whose delay exceeds that required to scan a row of the card, produce a continuous delay signal 270 until after the last row is sensed, which enables gate 168 to pass the series 266 of pulses from OR circuit 158 and which enables inverter 176 to produce a continuous disabling signal 272 to comparator 174 which is enabled to produce a transfer pulse 274 to registers 162, 164 only after signal 270 ceases and switches inverter output 272. At this time, the registration information identified in positions 180, 192 and 194, 206 of registers 162, 164 is transferred to registration circuits 208 via lines 210, 212, 214, 216 which carry signals P, $\overline{P}$, P, P from position 180, 192, 194, 206 respectively. Thus AND circuit 230 and then AND circuit 234 produce outputs, the latter of which energizes OR circuits 244, 248 resulting in signals to the reset inputs 258, 260 of flip-flop 254, 256 which produces a [0] on line 238 indicating that the card scanned was in posture [00], FIG. 5**.

Other embodiments will occur to those skilled in the art and are within the following claims:

What is claimed is:

1. An automatic reading system adapted to read information arranged in a plurality of sets on a medium, each of the sets including a plurality of items arranged to form a plurality of subsets of items, each subset including an item from each of the sets, the items being representations including either a first or second state, each subset including at least one item in said first state to function as a timing mark;

means for reading information carried by a said medium;

means, responsive to a signal from said means for reading that a subset of information contains a timing mark, for generating a timing signal each time a said subset including a timing mark is read;

storage means for storing information read from each of said sets of information sequentially by subset in response to said timing signals;

counter means, responsive to said timing signals, for counting the number of subsets read;

gating means, also responsive to said timing signals, for controlling input to said counter means;

comparator means, responsive to said counter means, for reading out information in said storage means when the count in said counter means reaches a predetermined number; and registration means, responsive to selected portions of the information including registration indicia, for determining the orientation of the medium read.

2. The system of claim 1 in which said means for reading includes means for sensing each of said sets of information.

3. The system of claim 2 in which said means for reading further includes a feeder device having a positioning aperture for orienting said medium including two pairs of surfaces transverse to each other, each pair having two oppositely inclined converging surfaces.

4. The system of claim 2 in which said means for sensing includes means for irradiating a said medium and means for receiving radiation from a said medium.

5. The system of claim 3 in which said feeder device further includes drive means for moving said medium therethrough including a pair of rollers and a motor for driving at least one of said rollers.

6. An automatic reading system adapted to read information arrayed in a plurality of sets on a medium, each of the sets including a plurality of items arranged to form a plurality of subsets of items each subset including an item from at least one of the sets, the items being representations including either a first or second state comprising: sensor means corresponding to each of said sets of information; an OR circuit responsive to an input from any one of said sensor means to produce a said output signal; a register means, associated with each of said sets of information and sensor means, for receiving information from its respective said sensor means in response to a said input signal from said OR circuit; comparator means for producing a transfer signal to each of said register means, reference means for providing a predetermined count to said comparator, counter means for counting each said input signal from said OR circuit and providing an input to said comparator means, gate means for controlling delivery of said input signals from said OR circuit to said counter means, and delay means responsive to said OR circuit for enabling said gate means each time a said input signal occurs for a period of time greater than that between successive said input signals derived from a medium, and for enabling, after the occurrence of that said input signal derived from a medium, said comparator means to produce a said transfer signal.

7. The system of claim 6 further including a feeder device for feeding a said medium to said sensor means including a feeder aperture for orienting a said medium in one of a plurality of predetermined postures, and drive means for moving said medium relative to said sensor means.

8. The system of claim 7 in which said feeder aperture includes two pairs of surfaces transverse to each other, each having two oppositely inclined surfaces.

9. The system of claim 8 in which said drive means includes a pair of rollers and a motor for rotating at least one of said rollers.

10. An automatic reading system adapted to read information arranged in a plurality of sets on a medium, each of the sets including a plurality of items arranged to form a plurality of subsets of items, each subset including an item from each of the sets, the items being representations including either a first or second state, each subset including at least one item in said first state to function as a timing mark for a reading machine, said information including registration indicia including four of said items, three of said registration indicia being items of one of said states and the fourth being an item in the other of said states, means for reading information carried by a said medium, means responsive to said means for reading for generating a signal each time a subset of information is read, means for storing information read from each of said sets of information sequentially by subset in response to a said signal, means responsive to said signals for monitoring the number of subsets read, means also responsive to said signals for controlling input to said means for monitoring, means responsive to said means for monitoring for reading out information in said storage means when the number of subsets read reaches a predetermined number, and registration means, responsive to selected portions of the information including registration indicia, for determining the orientation of the medium read.

* * * * *